(12) United States Patent
Verma et al.

(10) Patent No.: US 12,141,818 B2
(45) Date of Patent: Nov. 12, 2024

(54) SYSTEMS AND METHODS FOR LINKING INDICES ASSOCIATED WITH ENVIRONMENTAL IMPACT DETERMINATIONS FOR TRANSACTIONS

(71) Applicant: MASTERCARD INTERNATIONAL INCORPORATED, Purchase, NY (US)

(72) Inventors: Sangam Verma, Gurugram (IN); Rohit Chauhan, Somers, NY (US); Athanasia Xeros, St. Louis, MO (US); Karamjit Singh, Gurugram (IN); Nitendra Rajput, Gurgaon (IN); Tanmoy Bhowmik, Bangalore (IN); Aniruddha Mitra, Gurgaon (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 128 days.

(21) Appl. No.: 17/494,768

(22) Filed: Oct. 5, 2021

(65) Prior Publication Data
US 2022/0108328 A1 Apr. 7, 2022

Related U.S. Application Data

(60) Provisional application No. 63/088,438, filed on Oct. 6, 2020.

(51) Int. Cl.
*G06Q 30/018* (2023.01)
*G06N 3/04* (2023.01)
*G06Q 10/063* (2023.01)

(52) U.S. Cl.
CPC ............ *G06Q 30/018* (2013.01); *G06N 3/04* (2013.01); *G06Q 10/063* (2013.01)

(58) Field of Classification Search
CPC .... G06Q 30/018; G06Q 10/063; G06Q 30/06; G06Q 30/00; G06Q 40/00; G06N 3/0464; G06N 3/04; G06N 3/02
See application file for complete search history.

(56) References Cited

U.S. PATENT DOCUMENTS 7,617,122 B2 11/2009 Kumar et al.
8,572,011 B1* 10/2013 Sculley .................. G06N 20/00
707/723

(Continued)

FOREIGN PATENT DOCUMENTS

GB          2470216 A    11/2010
KR       20200064195       6/2020

(Continued)

OTHER PUBLICATIONS

Wang et al., "KGAT: Knowledge Graph Attention Network for Recommendation" (2019) (Year: 2019).*

(Continued)

*Primary Examiner* — Andrew Chase Lakhani
(74) *Attorney, Agent, or Firm* — Harness, Dickey & Pierce, P.L.C.

(57) ABSTRACT

Systems and methods are provided for determining an environmental impact of one or more transactions. An example method generally includes accessing transaction data representative of a plurality of transactions, where each of the transactions involves a user and a merchant, and accessing at least one index indicative of environmental impact of a plurality of merchants. The method also includes generating a graph based on the users and merchants included in the transaction data, whereby the graph is representative of the plurality of transactions, and determining a mapping between ones of the merchants involved in the transaction data and the environmental impact indicated by the at least one index, based on at least one of: the graph, the accessed at least one index, a graph convolution network (GCN), and a graph neural network (GNN). The method then includes publishing the mapping between the ones of the merchants and the environmental impact.

12 Claims, 5 Drawing Sheets

(56) References Cited

U.S. PATENT DOCUMENTS

| | | | |
|---|---|---|---|
| 9,519,913 | B2 | 12/2016 | Calman et al. |
| 9,947,035 | B2 | 4/2018 | Hamilton, II et al. |
| 10,902,484 | B1* | 1/2021 | Pepere .................. G06Q 20/145 |
| 11,403,643 | B2* | 8/2022 | Shekhar .................... G06N 7/01 |
| 2004/0044476 | A1 | 3/2004 | Miyamoto et al. |
| 2006/0089851 | A1* | 4/2006 | Silby ...................... G06Q 40/00 705/500 |
| 2006/0095356 | A1 | 5/2006 | Koornstra |
| 2009/0307049 | A1 | 12/2009 | Elliott, Jr. et al. |
| 2010/0223276 | A1 | 9/2010 | Al-Shameri et al. |
| 2011/0213690 | A1* | 9/2011 | Ghosh .................... G06Q 40/04 705/317 |
| 2013/0054332 | A1 | 2/2013 | Ross et al. |
| 2014/0324646 | A1* | 10/2014 | Patil ........................ G06Q 40/12 705/30 |
| 2018/0253635 | A1* | 9/2018 | Park .......................... G06N 3/02 |
| 2018/0308032 | A1* | 10/2018 | Kamal ............. G06Q 10/06393 |
| 2019/0108516 | A1* | 4/2019 | Jawaharlal ......... G06Q 20/3674 |
| 2019/0333256 | A1* | 10/2019 | Xu ........................ G06F 16/904 |
| 2021/0248449 | A1* | 8/2021 | Sun ..................... G06F 16/9024 |

FOREIGN PATENT DOCUMENTS

| | | | | |
|---|---|---|---|---|
| WO | WO2008/082631 | | 7/2008 | |
| WO | WO2018/200265 | | 11/2018 | |
| WO | WO-2021098372 A1 * | 5/2021 | ......... | G06F 16/9535 |

OTHER PUBLICATIONS

Wu et al "A Comprehensive Survey on Graph Neural Networks", IEEE Explore, published Aug. 2019, accessed Jun. 6, 2024 (Year: 2019).*

"A small bank close to the Arctic is making every credit card transaction take on climate change, and invites all other banks to do the same."; https://www.alandsbanken.com/news/alandsbanken-foerst-i-vaerlden-med-miljoevaenligt-betalkort-med-vilket-du-kan-maeta-din-miljoepaverkan; Jun. 15, 2016; 5 pgs.

My Carbon Action by Enfuce; https://enfuce.com/services/mycarbonaction/; web accessed Mar. 27, 2020; 4 pgs.

Guru Application; http://www.alpharca.studio/ma2/guru/; web accessed Mar. 26, 2020; 8 pgs.

Oroeco application; https://www.oroeco.com/; web accessed Mar. 27, 2020; 7 pgs.

Joro application; https://joro.tech/; web accessed Mar. 27, 2020; 12 pgs.

Åland Index Solutions; https://alandindexsolutions.com/; web accessed Mar. 27, 2020; 9 pgs.

Charlotte Edmond. This credit card has a carbon-emission spending limit. World Economic Forum. [online] May 13, 2019, (retrieved on Jan. 10, 2022). Retrieved from the internet: https://www.weforum.org/agenda/2019/05/this-credit-card-has-a-carbon-emission-spending-limit/; 3 pgs.

* cited by examiner

SYSTEMS AND METHODS FOR LINKING INDICES ASSOCIATED WITH ENVIRONMENTAL IMPACT DETERMINATIONS FOR TRANSACTIONS

CROSS-REFERENCE TO RELATED APPLICATION

This application claims the benefit of, and priority to, U.S. Provisional Application No. 63/088,438, filed Oct. 6, 2020. The entire disclosure of the above application is incorporated herein by reference.

FIELD

The present disclosure generally relates to systems and methods for linking indices indicative of environmental impact for actions by users, in connection with determining environmental impact for transactions by the users.

BACKGROUND

This section provides background information related to the present disclosure which is not necessarily prior art.

Payment cards are used to purchase a variety of different goods and services. In connection therewith, payment card transactions involving the payment cards are directed to and approved by issuers of the payment cards, whereby data related to the transactions and the payment cards involved in the transactions is accessible to the issuers. The issuers are generally known to use this information to market particular merchant partners to the cardholders, or to market particular goods to the cardholders either directly or through the merchant partners.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

People engage in a variety of activities that generally have an impact on their surrounding environment. In connection therewith, a carbon footprint, for example, is an expression of the amount of carbon dioxide and other carbon compounds emitted due to such activities of a particular person (or family, etc.). A carbon footprint associated with a particular activity may be built based on detailed analysis of the particular activity (e.g., consumption of a hamburger from a fast food chain versus consumption of a turkey sandwich from a locally owned deli, or versus consumption of a hamburger from a different fast food chain; etc.). More realistically, though, the carbon footprint of a particular activity is based on the category of the activity, whereby the carbon footprints of like activities involving like providers are assumed to be the same. The Aland index, for example, expresses carbon footprints, per category of activity, in dollars spent in the category. To leverage the Aland index, or other similar indices, transaction data may be defined in terms of the categories included in the indices.

Uniquely, the systems and methods herein provide an efficient and accurate mapping of transaction data to one or more index, whereby a carbon footprint or other measure of environmental impact may be derived from the transaction data for the underlying transaction(s) (broadly, for the underlying activity represented by the transaction data). What's more, the carbon footprint or other measure of environment impact may be derived for users performing transactions associated with the transaction data, and/or for merchants involved in the transactions.

Figure 1:
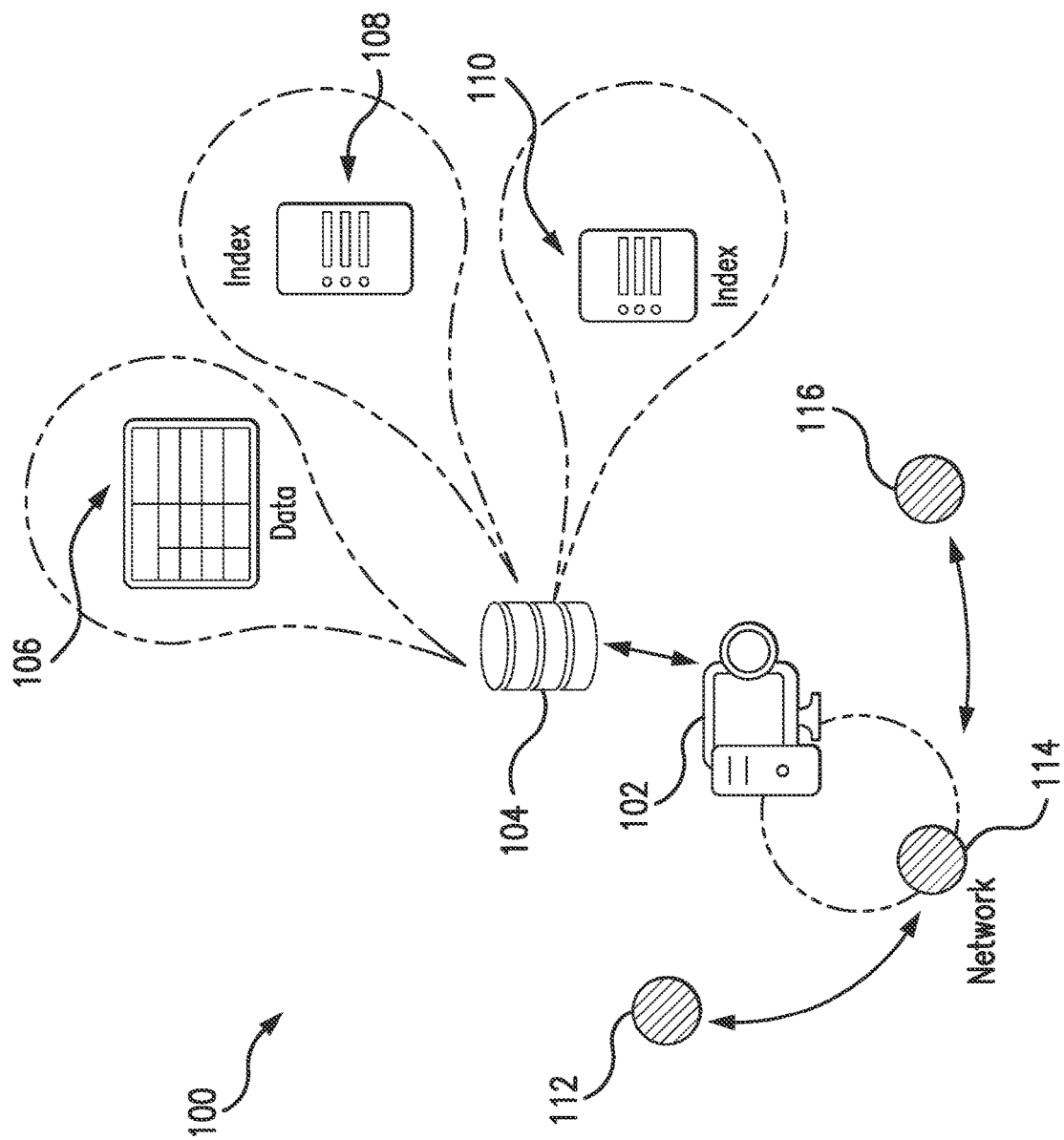
FIG. 1 is an example system of the present disclosure suitable for use in determining environmental impact of transactions by users.

FIG. 1 illustrates an example system 100, in which one or more aspects of the present disclosure may be implemented. Although, in the described embodiment, components of the system 100 are presented in one arrangement, other embodiments may include the same or different components arranged otherwise, depending, for example, on compilations of transaction data; authorization, clearing and settlement processes for transactions; available indices relating to environmental impact of user activities; privacy rules or regulations; etc.

Referring to FIG. 1, the system 100 generally includes a computing device 102 and a data structure 104. In the illustrated embodiment, the computing device 102 and the data structure 104 are both associated with and/or included in a payment network 114. That said, the computing device 102 and/or data structure 104 may be included otherwise in the system 100, for example, at least in part in an acquirer 112, an issuer 116, etc. In addition, the data structure 104 may be included in the computing device 102, or coupled to the computing device 102 via one or more networks (as suggested by the arrowed line). The one or more networks may involve wired and/or wireless connections, and may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or even combinations thereof.

The data structure 104 includes various types of data and indices (all broadly data). Specifically, in this example, the data structure 104 includes transaction data 106, a merchant index 108, and an environmental impact index 110.

The transaction data 106 in the data structure 104 includes one or more tables, or other structures, which include entries representative of payment account transactions by users to purchase products (e.g., goods or services, etc.). For example, in a payment account transaction, a user initiates the transaction by presenting credentials for a payment account (e.g., in the form of a primary account number (PAN) or token, etc.) via a card, a virtual wallet, a fob, a mobile device, or otherwise to a merchant or other entity (not shown) (e.g., at a physical or virtual location, etc.). The payment account may include, for example, a credit account, a debit account, a prepaid account, etc.

In turn, the merchant compiles an authorization request for the transaction (including a merchant category code (MCC) associated with the merchant) and transmits the authorization request to the acquirer 112 (e.g., where the acquirer 112 has provided an account to the merchant, etc.). The acquirer 112 then communicates the authorization request with the issuer 116 of the payment account, through the payment network 114, such as, for example, through Mastercard®, VISA®, Discover®, American Express®, etc. Upon receiving the authorization request, the issuer 116 is associated with a transaction identifier (Trx ID), a primary account number (PAN) (partially obscured), a transaction amount (Trx Amt), a super industry (e.g., a description of the industry to which the transaction relates, etc.), a merchant category code (MCC) (broadly, a merchant category) for a merchant involved in the transaction, a merchant ID for the merchant involved in the transaction, and a location of the transaction and/or merchant involved in the transaction. That said, it should be appreciated that the transactions in the transaction data 106 may be associated with additional or different data than illustrated in other embodiments. What's more, the transaction data 106 may be included in the data structure 104 in the format of Table 1 or in other similar formats and/or tables or in other structure embodiments.

TABLE 1

| Trx ID | PAN | Trx Amt ($) | Super Industry | MCC | Merchant ID | Location |
|---|---|---|---|---|---|---|
| 0123 | ***1234 | 12.00 | Construction Services | 1520 | **123 | CA |
| 0124 | ***4356 | 10.00 | Health and Personal Care Store | 5912 | **786 | WI |
| 0125 | ***8770 | 7.00 | Health and Personal Care Store | 5912 | **001 | NY |
| 0126 | ***7652 | 121.00 | Other Services | 5542 | **654 | AL |
| 0126 | ***1234 | 105.00 | Accommodation and Food Services | 5812 | **990 | AK |
| 0127 | ***1234 | 45.00 | Health and Personal Care Store | 5912 | **776 | CO |
| 0128 | ***3452 | 8.00 | Other Services | 5542 | **651 | IL |
| ... | ... | ... | ... | ... | ... | ... | configured to determine, among other things, whether the payment account is in good standing and whether there are sufficient funds and/or credit associated with the account to cover the transaction. Following this determination, the issuer 116 is configured to compile and transmit an authorization reply (indicating the transaction is approved or declined) back to the merchant, via the payment network 114 and the acquirer 112, thereby permitting the merchant to complete or end the transaction. The transaction (if approved) is later cleared and/or settled (via appropriate transaction messages such as clearing messages and/or settlement messages, for example) by and between the merchant, the acquirer 112, and the issuer 116 (by appropriate agreements), via the payment network 114.

Data is generated, collected, and stored as part of the above example interactions among the merchant, the acquirer 112, the payment network 114, and the issuer 116, and stored in the data structure 104 as the transaction data 106. The transaction data 106 generally includes a plurality of transaction records, one for the above transaction and for each additional transaction associated with the system 100 (e.g., including authorized transactions, cleared and/or settled transactions, attempted transactions, declined transactions, etc.). The transaction data 106, in this example embodiment, is stored at least by the payment network 114 (e.g., in the data structure 104, etc.), but could be stored in other parts of the system 100 and transmitted as needed or requested. As used herein, the transaction data 106 may include, for example (and without limitation), PANs for accounts involved in the transactions, amounts of the transactions, merchant IDs for merchants involved in the transactions, categories (e.g., MCCs, etc.) for the merchants, approve/decline indictors for the transactions, dates/times of the transactions, geo-locations of the transactions, etc.

Table 1 includes example transaction data 106, for a number of example transactions, that may be included in the data structure 104. As shown, each of the transactions is It should also be appreciated that more or less information related to transactions, as part of either authorization, clearing, and/or settlement, may be included in transaction records (comprising transaction data 106) and stored within the data structure 104 (or otherwise in the system 100, at the merchant, the acquirer 112, the payment network 114, and/or the issuer 116, etc.). For instance, transaction records may additionally (or alternatively) include a card type used in the transaction, a date of the transaction, a type of the transaction (e.g., ecommerce, point-of-sale terminal, etc.), an indication of whether or not the transaction is a recurring transaction, etc.

In addition, as described above the data structure 104 is associated with and/or included in the payment network 114 in the illustrated system 100, whereby the transaction data 106 is generally associated with and/or included in the payment network 114. But again, the computing device 102 and/or data structure 104 may be included otherwise in the system 100, for example, at least in part in the acquirer 112, the issuer 116, etc., whereby the transaction data 106 may be associated with and/or included in one or more of the other parts of the system 100 (e.g., the acquirer 112, the issuer 116, etc.).

With continued reference to FIG. 1, the merchant index 108 of the data structure 104 includes an index of categories of merchants, each having a specific code. In this example embodiment, the categories of merchants in the merchant index 108 are associated with MCCs (whereby the index 108 may be viewed as a merchant category code index). As such, in this example, the index 108 includes a listing of merchant categories each associated with an MCC. Table 2 includes a listing of multiple example merchant category codes (MCCs) (broadly, merchant categories) and a corresponding description.

TABLE 2

| MCC | Description |
| --- | --- |
| 1520 | General Contractors |
| 3001 | American Airlines |
| 5542 | Automated Fuel Dispensers |
| 5532 | Automotive Tie Stores |
| 5812 | Restaurants |
| 5912 | Pharmacies |
| ... | ... |

In connection therewith, the transaction data 106 also includes a category (e.g., an MCC, etc.) for each transaction represented thereby, indicating the category of the merchant participating in the transaction (e.g., as illustrated in Table 1, etc.). As such, the transaction data 106, and each transaction included therein, and the data representative of the transaction (e.g., transaction amount, time/date, etc.), may be linked through the MCC to the merchant index 108.

The index 110 includes an environmental impact index, which may express an impact of an activity or action by a user, such as, for example, a carbon footprint for the activity or action, in terms on one or more categories and/or by one or more units of measure. In this example, the index 110 includes the Aland index, which provides a carbon footprint per dollar spent by a user, per category of a merchant. Table 3 includes an example segment of the index 110 (e.g., as represented in this example by the Aland index, etc.).

TABLE 3

| Category of Merchant | Carbon Per U.S. Dollar |
| --- | --- |
| Bars, lounges, discos, nightclubs, taverns - alcoholic drinks | 81.05 |
| Restaurants | 79.64 |
| Clothing | 29.6 |
| Gambling transactions* | 380.66 |
| Florists | 46.96 |
| Pet shops, pet foods and supplies | 63.34 |
| Package stores - beer, wine, liquor | 80.61 |
| Drug Stores Pharmacies | 43.87 |
| Motion Picture Theaters | 27.38 |
| Fuel | 1186 |
| Book stores | 26.98 |
| Taxicabs | 1186 |
| Airlines | 1121.52 |
| Railroads, freight | 335.63 |
| ... | ... |

As can be seen from Tables 2-3, the categories included in the merchant category index 108 (e.g., the MCCs, etc.) and the categories included in the environmental impact index 110 (e.g., the categories of merchant, etc.) are different. As such, while the categories may potentially overlap in general terms between the merchant category index 108 and the environmental impact index 110, direct mapping, on a one-to-one basis, between these indices 108 and 110 is not permitted, or potentially, desired (because of the particular differences in the categories used for the merchants).

In addition, in other examples, the environmental impact index 110 may include a different index, other than the Aland index, which may express an environment impact of a user's activities or actions in terms of a specific merchant, rather than a category of merchants, as described above. One example of such an index includes the Trucost® index, which expresses the industry for a given merchant along with the carbon footprint of the actual merchant and the revenue of the merchant. So, for example, in this index, merchant A may be a regional bank, in the United States, with 1,500 tons CO2 of direct and indirect environmental impact, for $250 million in revenue. By such data, it should be appreciated that a carbon footprint, per dollar transaction with merchant A, may be determined (for the specific merchant A and not a general category of the merchant A).

Thus, it should be appreciated that the environmental impact index 110 may include any suitable index, which expresses, for example, a carbon footprint (or other impact) in one or more environmental metrics and in terms of one of more financial metrics (e.g., CO2 per merchant category, per dollar; CO2 per merchant, per dollar; etc.).

That said, in operation of the system 100, the computing device 102 is configured to link (or map) the transaction data 106 and the environmental impact data in the index 110. In general, the computing device 102 may be configured in a number of different manners to provide the link or mapping between a particular transaction (or specific category) in the transaction data 106 and an environmental impact associated with the environmental impact index 110.

In a first implementation of the system 100, the computing device 102 is configured to generate a graphical representation of the transaction data 106, in which merchants and users are represented by nodes, and edges (or lines) between the nodes are indicative of transactional links between the merchants and users (e.g., disjointed sets) (e.g., as part of an unsupervised graph embedding using DeepWalk, etc.). In this implementation, the graphical representation includes a bipartite knowledge graph 200, as illustrated, for example, in FIG. 2. As shown, on the left side of FIG. 2, the graph 200 includes N example user nodes, $U_1, U_2, U_3, \ldots U_N$, and K example merchant nodes, $M_1, M_2 \ldots M_K$, as part of a user-merchant graph 202. Multiple edges are shown between the user nodes and the merchant nodes (by arrowed lines), as representative of individual transactions, for example, for which the amounts of the transactions may be: $20, $15, etc. The graphical representation may be limited in a number of ways, including, for example, by time, location, etc. As such, for a given set of transaction data 106, bipartite graphs may be generated, by the computing device 102, for each year, and for each of several regions (e.g., countries, states, territories, cities, etc.). In one example, bipartite graphs may be generated by the computing device 102 for 2018 transaction data and 2019 transaction data, for each of India, the United States, and the United Kingdom, etc., thereby providing six separate graphs.

It should be understood that the bipartite knowledge graph 200 is employed herein to represent the spend behavior connecting users and merchants (as nodes) through transactions (edges) therebetween. As such, the graphical representation of connected transactional instances between merchants and users is suitable to derive carbon footprints, in granularity at a merchant, user and transaction level, with added space-time complexity through machine learning on a graph. In this way, the computing device 102 is configured to provide a highly granular view at user/merchant/transaction levels by learning embeddings in the bipartite graph 200 based on spend behavior. Supervised graph learning is then employed to aid in mapping the granular views of the elements into carbon footprints based on the broad MCC level carbon footprints or known carbon footprints of only a limited set of merchants. Spend behavior differences across transactions over space and time are then relied on in various embodiments. The bipartite transaction graph 200 is employed, by the computing device 102, to convert single-transaction views to a graph view and to derive more insights than from the single transaction views. As an example, if a user makes a transaction at an electronics store in May and his electricity bill increases significantly in June, it may be assumed, in this example, that the purchase made at the electronics store was a high carbon-footprint purchase. If this occurs frequently with multiple users who purchase from the same merchant, it can be concluded that the merchant is a high carbon-footprint seller (as compared to other merchants having the same MCC). Scaling such analysis with connected graphs between thousands, millions, or more or less, merchants and thousands, million, or billions or more or less users enables intelligence to be derived from such transaction mining. It should be understood, then, that embeddings learned for two merchants within the same MCC may be different due to differences in spend behavior between them. This may enable graph learning algorithms to differentiate between merchant carbon footprints within the same category and thereby reaching merchant level granularity. Such insight can provide much more specific information about a transaction than previously available. This specific information can then be provided to carbon-footprint calculators utilizing rules to determine the carbon footprints of different activities. Consequently, the computing device 102 is permitted to provide precise estimates of the carbon footprints for users and/or merchants with regard to transactions performed therebetween.

Next in the system 100, and given the above, an estimated mapping between the categories of the MCCs, for example, of the merchant index 108 and merchant categories of the environmental impact index 110 are defined, in terms of a vector M, for example, associated with a particular node V (e.g., for a particular node in the bipartite graph 200, etc.). In particular, for a restaurant merchant (per the merchant index 108) associated with the node V, for example, the vector $M_V$ may include a value (e.g., 1, etc.) for bakery, food and liquor categories (as associated with the environmental impact index 110), and a zero for each other category. Table 4 illustrates an example vector $M_V$ for the restaurant merchant.

TABLE 4

| Restaurant | = | = | Bakery | Food | = | Liquor | = | = |
|---|---|---|---|---|---|---|---|---|
| $M_V$ | 0 | 0 | 1 | 1 | 0 | 1 | 0 | 0 |

In another example, the vector M may include a single value, where, for example, a confectionary would sell only bakery items thereby having a value in Table 4 only in the "Bakery" column, and not in the "Food" or "Liquor" columns. The estimated mapping, by vector, is created for all of the nodes in the bipartite graph 200, where the vector includes one or more values indicative of the estimated mapping, etc. For example, a single value in the vector would indicate a one-to-one mapping. In this embodiment, the estimated mapping may be generated, by the computing device 102, through fuzzy matching and/or substring analysis of the transaction data 106, and in particular, merchant data included therein (and potentially, other data).

Figure 2:
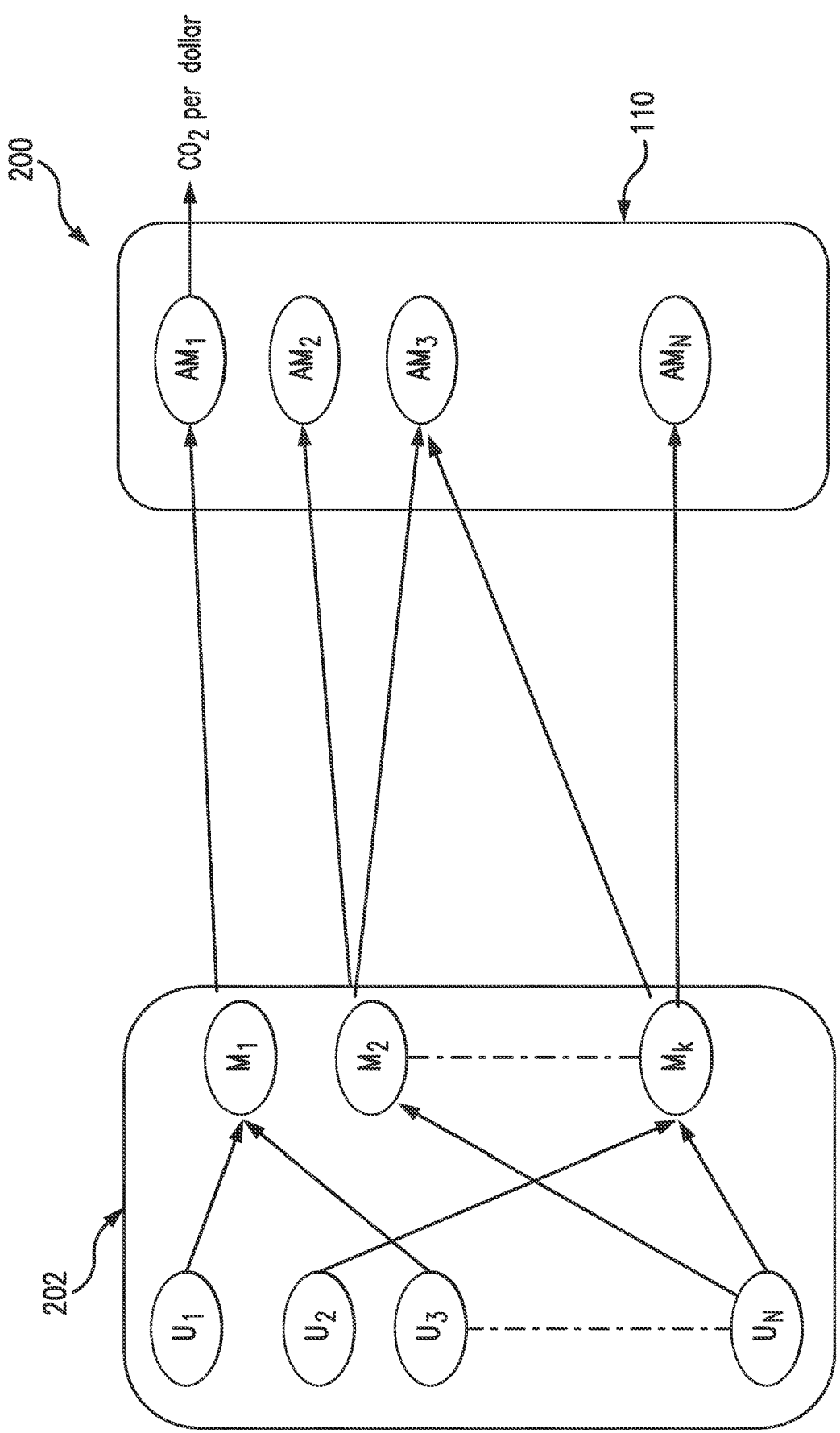
FIG. 2 is a graphical representation of an example transaction that may take place in the system of FIG. 1, based on user and merchant nodes included in the system.

FIG. 2 also shows the estimated mapping between the merchants (based on their MCCs) and the environmental impact index 110 (based on the merchant categories therein). As shown, the merchants, which are often associated with one MCC, are mapped or linked to one or more categories of the environmental impact index 110, illustrated as nodes $AM_1$, $AM_2$, $AM_3$ . . . $AM_N$. The mapping or linking, represented by the further edges (or lines) between the merchant nodes, $M_1$, $M_2$ . . . $M_K$ and the index category nodes $AM_1$, $AM_2$, $AM_3$ . . . $AM_N$ is indicative of the estimated mapping vector M.

Thereafter, the computing device 102 is configured to train a model. In particular, in this example, the computing device 102 is configured to learn via a graph neural network (GNN), which is related to the dependencies between the nodes in the above generated graph(s). The computing device 102 is configured to learn a state embedding $h_v \in R^N$, indicating that $h_v$ is a real number vector of N dimension and which contains the information of a neighborhood for nodes. The state embedding $h_v$ is an N-dimension vector of node V and can be used to produce an output $o_v$. As such, when f and g are parametric functions, then $h_v$ and $o_v$ may be defined as Equations (1) and (2).

$$h_v = f(x_v, x_{co[v]}, h_{ne[v]}, x_{ne[v]}) \quad (1)$$

$$o_v = g(h_v, x_v) \quad (2)$$

In the context of the above, the term $x_v$ is a feature of the node V, which is created by various merchant variables, such as, for example, MCC, merchant location, merchant super industry type, and the vector M for the merchant (as described above) (e.g., as an encoded vector indicative of information about categories of items a merchant offers for sale, etc.). Similar features can also be created for user nodes, for example, as distributions of industries at which users have transacted, card types (e.g., World, Elite card types, etc.), user locations and/or card issued locations, types of cards by brand, etc.

The term $x_{co[v]}$ provides features of neighboring edges of the specific node V. The features of the edges will include, for example, user merchant interactions, such as modes of transaction (e.g., pin, pin-less, magnetic stripe, offline chip, etc.), amounts of transactions, distances between users and merchant states, etc.

The term $h_{ne[v]}$ provides states of the neighboring nodes, and which is learned when (or as) the model progresses. The term $x_{ne[v]}$ provides features of the neighboring nodes of node V, which is similar to node features created in $x_v$. And, the term $o_v$ includes the output vector of each node, specifying the distribution of each merchant to the different categories of the environmental impact index 110. It should be appreciated that the specific distribution will be indicative of one or more products each merchant offers for sale. For example, a restaurant merchant A (not shown) may include 70% food items and 30% liquor items, whereby the distribution includes 0.7 for food and 0.3 for liquor.

In view of the above, with the vectors H, O, X, and $X_N$ constructed, by the computing device 102, by stacking all of the states, all of the outputs, all of the features, and all of the node features, respectively, Equations (3) and (4) are then provided.

$$H = F(H, X) \quad (3)$$

$$O = G(H, X_N) \quad (4)$$

In connection therewith, the computing device 102 is then configured to employ an iterative sequence, for example, as defined by Equation (5).

$$H_{t+1} = F(H_t, X) \quad (5)$$

In the context of the above, the term $H_t$ denotes the t-th iteration of H. Through the iteration, the computing device 102 is configured to converge to the solution of Equation (3) for any initial value H(0). In addition, through the iteration, the matrix H is learned and includes node vector $h_v$ by mining spend behavior from transaction graphs provided for achieving the granular carbon footprint mapping. The embedding for merchants, even in the same MCC, will be different due to the difference in the spend behavior among users for the merchants. Specifically, for example, Car Company A (selling combustion powered vehicles) and Car Company B (selling electric powered vehicles) both fall in the automobile category. But an electric powered vehicle provided by Car Company B typically provides a lower carbon footprint than a combustion powered vehicle from Car Company A. When the computing device 102 performs analysis of the spend for the two vehicles separately, the difference is realized. Then, by the connected transaction knowledge, based on the bipartite graph 200, the computing device 102 is configured to determine that users purchasing from Car Company A regularly spend to buy fuel, while users purchasing vehicles from Car Company B do not. Consequently, the computing device 102 is configured, by the equations above, through the embedding space, to determine vector representations, such as, for example, $h_{v[A]}$ and $h_{v[B]}$. The vector $h_{v[A]}$ will be more closer to (or more representative of) a vector of fuel merchants as compared to $h_{v[B]}$, in this example. Hence, different carbon footprints will be calculated for each of Car Company A and Car Company B based on their learned embeddings, which are vectors representative of the fixed dimension N that are learned using Equation (1) above.

With the target information for the given merchant (e.g., the vector M for the given merchant node, etc.) provided for the supervision, the computing device 102 is further configured to determine a loss through Equation (6).

$$\text{loss} = \Sigma_{c=1}^{K} M_{v,c} \log(O_{v,c}) \quad (6)$$

In the context of the above, the term K is the number of classes in a standard carbon calculator, as defined by the environmental impact index 110, and the vector $M_{v,c}$ defines the $c^{th}$ index for $M_v$. And, the term $O_v$ defines the predicted distribution, while $O_{v,c}$ defines the $c^{th}$ index of $O_v$.

It should be appreciated that the computing device 102 is configured, by the above, to train weightings for the mappings F and G and thus weightings for a given user, merchant or transaction, whereby a probabilistic distribution can be found that is given by O for each node. Overall, based on certain merchants for which exact information is available about the categories of its items and the overall graph network between different merchants and users (supervised merchants), an approximate distribution of merchants can be derived. Hence, instead of directly using a carbon footprint of one item for a merchant, the computing device 102 is permitted to calculate a merchant's footprint based on the distribution of items generated. Therefore, computing device 102 is permitted to find different carbon footprints of merchants, even when the merchants are in the same categories.

It should be further appreciated that the model can be trained and deployed for different regions and/or time periods by applying the above algorithms/equations to each of the separate spatio-temporal graphs for the different regions and/or time periods.

The computing device 102 is configured to then employ the above to determine an environmental impact for each of a plurality of transactions recorded and included in the transaction data 106, or in real time (or near real time (e.g., within a few seconds, within 30 seconds, within a minute, within a few minutes, etc.) as transactions are authorized, cleared, settled, requested, etc. (e.g., as an environmental impact for the users performing the transactions, as carbon profiles for the users, etc.). The computing device 102 is further configured to present the environmental impact at one or more interfaces (e.g., as defined by a mobile application, website, etc.) or otherwise, as suitable, to relay the output (e.g., the environmental impact, etc.) to one or more suitable users, etc. What's more, a particular merchant or a particular purchase (or purchases) associated with the merchant may be rated according to environmental impact, whereby the merchant may be designated as one of various green merchants and/or associated with one or more of various categories (e.g., merchants in a least 10% of carbon footprints as compared to all other merchants, or merchants in a category, etc.) (e.g., as an environmental impact for the merchants, as carbon profiles for the merchants, etc.). The computing device 102 may further be configured to direct offers and/or discounts, to users or even merchants, based on the environmental impact of merchants and/or users associated with the merchants (e.g., to steer users to more environmentally conscientious purchasing, to steer merchants to more environmentally conscious product offerings, etc.).

In a second implementation of the system 100, similar to the above, the computing device 102 is configured to generate a graphical representation of the transaction data 106, in which merchants and users are represented by nodes, and edges between the nodes are indicative of transactional links between the merchants and users (i.e., disjointed sets). In this implementation, the graphical representation includes a bipartite knowledge graph 300, as illustrated, for example, in FIG. 3. As shown, on the left side of FIG. 3, the graph 300 includes N example user nodes, $U_1, U_2, U_3, \ldots U_N$, and K example merchant nodes, $M_1, M_2 \ldots M_K$, as part of a user-merchant graph 302. Multiple edges are shown (as arrowed lines) between the user nodes and the merchant nodes, as representative of individual transactions between the users and the merchants. As above, in various embodiments, the graphical representation may be limited in a number of ways, including, for example, by time, location, etc. What's more, in some examples, an adjacency matrix may further be compiled for the merchant and users for nodes of the graphical representation (e.g., to provide connections (or additional connections) between the merchant and the users, etc.), where a weight value (e.g., a value "w", etc.) may be provided, for example, in an i,j position (and/or in other positions) of the adjacency matrix (e.g., for user nodes $U_i$, $U_j$ and/or for the merchant node $M_i$, $M_j$; etc.), representing the edge weight between node-i and node-j for each of the users and/or merchants. As such, a weight value of 0 means there is no edge between the nodes. In connection therewith, then, the adjacency matrix may include both merchant and users in rows and columns (as generally shown in FIG. 3), whereby the matrix is symmetric and a diagonal of the matrix is 1.

Figure 3:
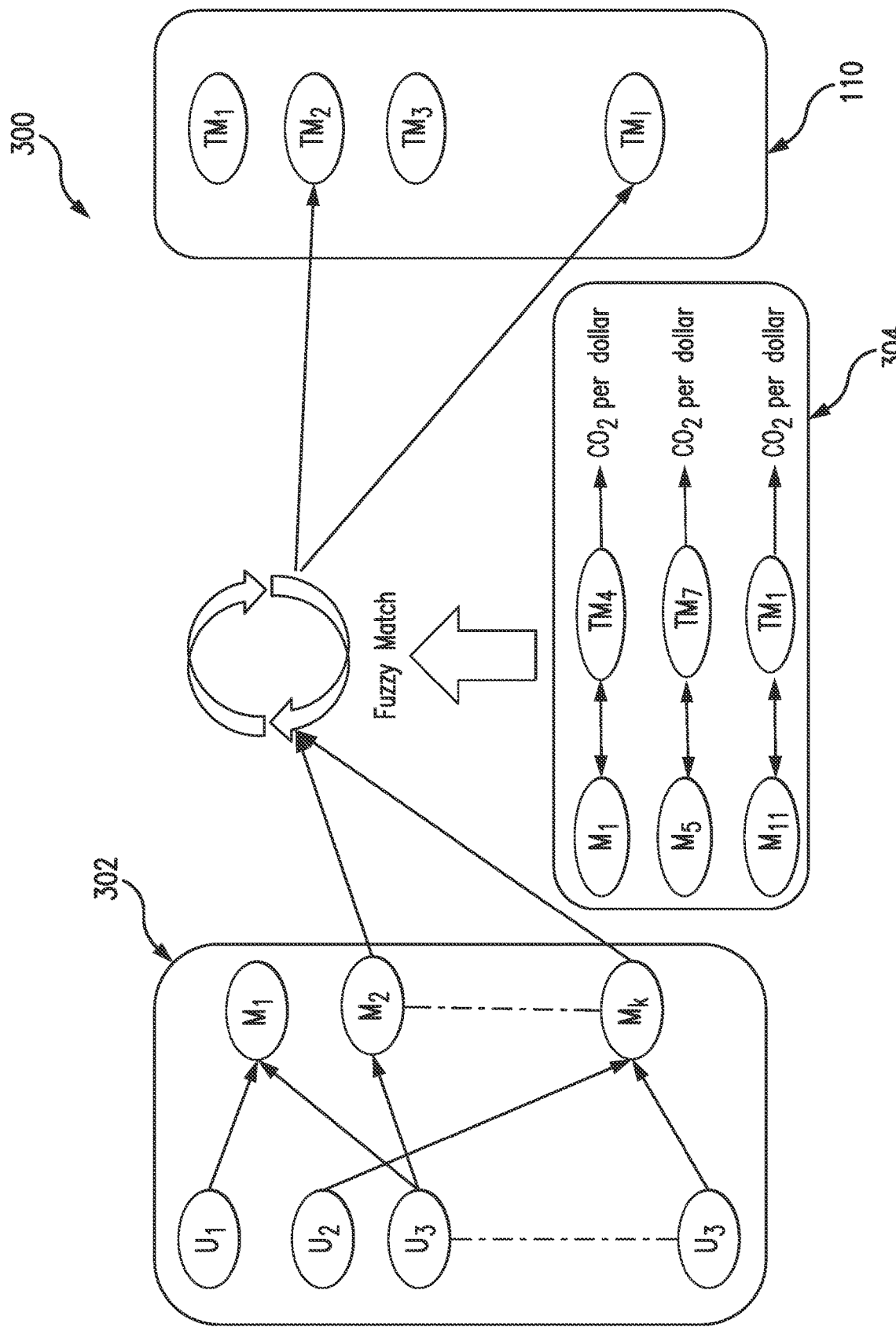
FIG. 3 is a graphical representation of another example transaction that may take place in the system of FIG. 1, based on user and merchant nodes included in the system, and which is mapped to an index through fuzzy analytical techniques.

Also in FIG. 3, a number of particular merchants may be included in the environmental impact index 110, such as, for example, merchant $M_1$, merchant $M_5$ and merchant $M_{11}$, whereby there is a precise mapping 304 of the merchants to the environmental impact index 110 (and specifically, to nodes $TM_4$, $TM_7$, and $TM_1$ of the environmental impact index 110, respectively).

Next in this second implementation, in addition to the mapping of the first implementation (e.g., to represent each user and/or merchant in a graph as an N-dimensional vector, etc.), the computing device 102 is further configured to perform a Graph Convolutional Network (GCN) analysis. In particular, the computing device 102 is configured to rely on the node features and the adjacency matrix noted above. In particular, a feature matrix is associated with each of the nodes, where the features (indicated in the matrix) include the participation of the node (or the merchant) in a particular category or categories (e.g., MCC, super-industry category, industry, etc.). The number of dimensions is then equal to, or associated with, in this example, the number of categories to which the merchant may be assigned (e.g., 27 dimensions for the super-industry categories, etc.), whereby the feature matrix represents the distribution of transactions over those categories. Likewise, the adjacency matrix, as described above, may include a matrix of the transaction interactions between the users and merchants whereby the matrix values include the amount of the transaction(s) between the users and the merchants (as associated with the bipartite graph 300 described above).

Illustration of the GCN analysis is provided in Equation (7) and Equation (8). The output, i.e., the matrix Z, is the carbon footprint mapping of merchants/users, where A is the adjacency matrix, D is the degree of matrix of A, $W_0$ and $W_1$ are learnable filter weights for the first and second GCN layers, and X is the input feature matrix.

$$Z = A(\text{ReLU}(AXW_0)W_1) \tag{7}$$

$$A = D^{-1/2}AD^{-1/2} \tag{8}$$

In particular, a training set of data, for example, as defined by the environmental impact index 110, is generated (or retrieved) that may link a specific merchant to a carbon foot print. The computing device 102 is configured to train the model, with the training data as the matrix Z, to identify desired and/or suitable values for $W_0$ and $W_1$. Also, ReLU represents details of activations used, and which is a rectified linear unit defined as the positive part of its argument. In connection therewith, Jaccard Similarity may be used in building the adjacency matrix A, for example, to define merchant-merchant connections to give extra input to the model (e.g., in order to create (e.g., artificially, etc.) such merchant-merchant connections where they may not exist in the bipartite knowledge graph 300, etc.). Once trained, the computing device 102 is then configured to determine the matrix Z for the merchants included in the adjacency matrix A to provide mappings of a merchant/user to its carbon footprint (which is the GCN mapping).

Then in this example, the computing device 102 is configured to combine the vector from the mapping from the first implementation above (e.g., based on the GNN analysis, etc.), with the mapping from the second implementation (e.g., from the GCN analysis, etc.) through regression and weighted learning to provide a combined mapping for the environmental impact index 110, whereby an environmental impact for a transaction is provided. In particular, regression provides a machine learning technique that approximates a function, mapping the features (e.g., embeddings from the above determined mapping for carbon footprints and target encodes, etc.) to targets (e.g., carbon footprints, etc.). The computing device 102 is configured to build two different regression models that learn to predict carbon footprints from embeddings found through the GNN and GCN analysis. The two sets of predictions pertaining to these two sets of embeddings are utilized, instead of choosing one over the another, whereby the regression models are integrated here to provide for improved performance by way of the combination. For example, the computing device 102 may be configured to rely on ensembling (or ensemble learning, etc.), i.e., weighted averaging. The computing device 102 is configured to then learn the weights (e.g., relative importance to be attached to these two predictions, etc.) via the final regressor (e.g., with $c11$ as an output predicted from the first model (GNN) and $c12$ as an output predicted from second model (GCN), the final output $c1$ is predicted as $w11*c11+w12*c12$, where $w11$ and $w12$ are weightage importance of their individual performance; etc.).

And, as in the first implementation, the computing device 102 may be configured to then employ the above (from the second implementation) to determine an environmental impact for each of a plurality of transactions recorded and included in the transaction data 106, or in real time (or near real time (e.g., within a few seconds, within 30 seconds, within a minute, within a few minutes, etc.) as transactions are authorized, cleared, settled, requested, etc. (e.g., as an environmental impact for the users performing the transactions, as carbon profiles for the users, etc.). The computing device 102 may further be configured to present the environmental impact at one or more interfaces (e.g., as defined by a mobile application, website, etc.) or otherwise, as suitable, to relay the output (e.g., the environmental impact, etc.) to one or more suitable users, etc. What's more, a particular merchant or a particular purchase (or purchases) associated with the merchant may be rated according to environmental impact, whereby the merchant may be designated as one of various green merchants and/or associated with one or more of various categories (e.g., merchants in a least 10% of carbon footprints as compared to all other merchants, or merchants in a category, etc.) (e.g., as an environmental impact for the merchants, as carbon profiles for the merchants, etc.). The computing device 102 may further be configured to direct offers and/or discounts, to users or even merchants, based on the environmental impact of merchants and/or users associated with the merchants (e.g., to steer users to more environmentally conscientious purchasing, to steer merchants to more environmentally conscious product offerings, etc.).

As such, from the above (in either the first or the second implementations), carbon footprint profiles may be generated and/or provided and/or updated for the users and merchants. In connection therewith, the uses may be made aware about the impact they are creating on the environment through their carbon footprint profile. Similarly, the merchants may be made aware about the impact they are creating on the environment through their carbon footprint profile. Further, the extra levels of granularity provided herein (in the analysis of individual transactions, etc.) may provide for improved accuracy in the user and merchant carbon footprint profiles, as well as making the profiles more particular to the corresponding users and merchants (as opposed to relying on more generic data for general transactions and/or general merchants in generating the profiles) (e.g., the profiles may be more personal to the users and/or merchants, and therefore more meaningful, as they are actually based on the particular actions of users and merchants, etc.).

Figure 4:
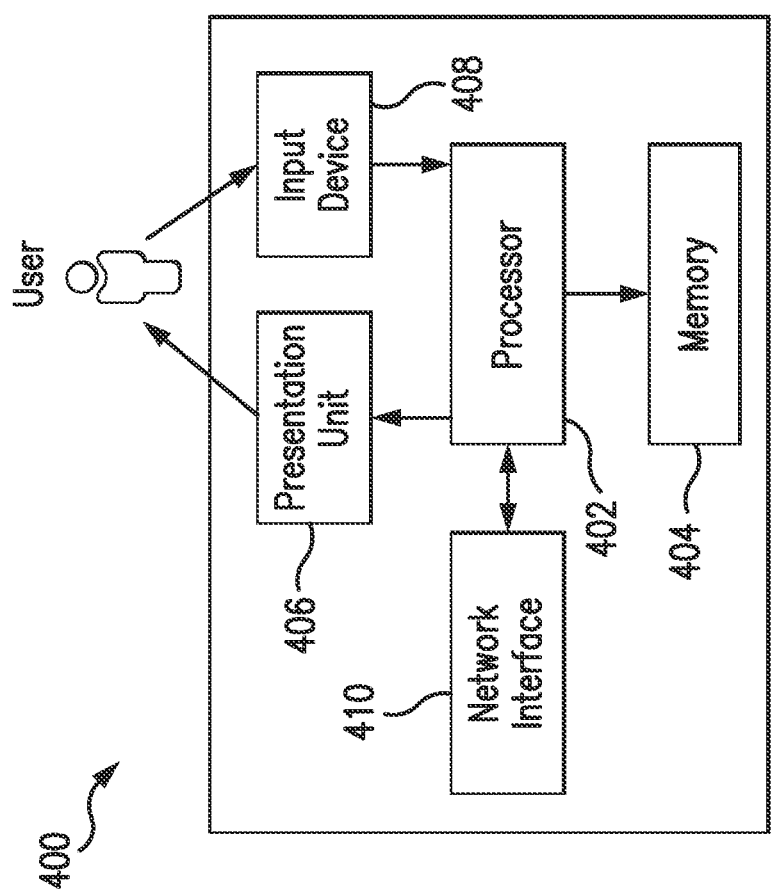
FIG. 4 is a block diagram of a computing device that may be used in the example system of FIG. 1.

FIG. 4 illustrates an example computing device 400 that can be used in the system 100. The computing device 400 may include, for example, one or more servers, workstations, computers, laptops, tablets, smartphones, virtual devices, etc. In addition, the computing device 400 may include a single computing device, or it may include multiple computing devices located in close proximity or distributed over a geographic region, so long as the computing devices are specifically configured to operate as described herein. In the example embodiment of FIG. 1, at the least, the computing device 102 may include and/or may be implemented in one or more computing devices consistent with computing device 400. In addition, the data structure 104, or the structures therein, may include, be associated with and/or in communication with, a computing device at least partially consistent with the computing device 400 (or a part thereof, such as, for example, memory 404, etc.). However, the system 100 should not be considered to be limited to the computing device 400, as described below, as different computing devices and/or arrangements of computing devices may be used. In addition, different components and/or arrangements of components may be used in other computing devices.

As shown in FIG. 4, the example computing device 400 includes a processor 402 and a memory 404 coupled to (and in communication with) the processor 402. The processor 402 may include one or more processing units (e.g., in a multi-core configuration, etc.). For example, the processor 402 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 404, as described herein, is one or more devices that permit data, instructions, etc., to be stored therein and retrieved therefrom. In connection therewith, the memory 404 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 404 is configured to store data including, without limitation, transaction data, indices, and/or other types of data (and/or data structures) suitable for use as described herein. Furthermore, in various embodiments, computer-executable instructions may be stored in the memory 404 for execution by the processor 402 to cause the processor 402 to perform one or more of the operations described herein (e.g., one or more of the operations of method 500, etc.) in connection with the various different parts of the system 100, such that the memory 404 is a physical, tangible, and non-transitory computer readable storage media. Such instructions often improve the efficiencies and/or performance of the processor 402 that is performing one or more of the various operations herein, whereby such performance may transform the computing device 400 into a special-purpose computing device. It should be appreciated that the memory 404 may include a variety of different memories, each implemented in connection with one or more of the functions or processes described herein.

In the example embodiment, the computing device 400 also includes a presentation unit 406 that is coupled to (and is in communication with) the processor 402 (however, it should be appreciated that the computing device 400 could include output devices other than the presentation unit 406, etc.). The presentation unit 406 may output information, visually or otherwise, to a user of the computing device 400, etc. It should be further appreciated that various interfaces (e.g., as defined by network-based applications, websites, etc.) may be displayed at computing device 400, and in particular at presentation unit 406, to display certain information to the user. The presentation unit 406 may include, without limitation, a liquid crystal display (LCD), a light-emitting diode (LED) display, an organic LED (OLED) display, an "electronic ink" display, speakers, etc. In some embodiments, presentation unit 406 may include multiple devices. Additionally or alternatively, the presentation unit 406 may include printing capability, enabling the computing device 400 to print text, images, and the like, on paper and/or other similar media.

In addition, the computing device 400 includes an input device 408 that receives inputs from the user (i.e., user inputs), etc. The input device 408 may include a single input device or multiple input devices. The input device 408 is coupled to (and is in communication with) the processor 402 and may include, for example, one or more of a keyboard, a pointing device, a mouse, a touch sensitive panel (e.g., a touch pad or a touch screen, etc.), or other suitable user input devices. It should be appreciated that in at least one embodiment an input device 408 may be integrated and/or included with a presentation unit 406 (e.g., a touchscreen display, etc.).

Further, the illustrated computing device 400 also includes a network interface 410 coupled to (and in communication with) the processor 402 and the memory 404. The network interface 410 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network capable of supporting wired and/or wireless communication among two or more of the parts illustrated in FIG. 1, etc.), including with other computing devices used as described herein.

Figure 5:
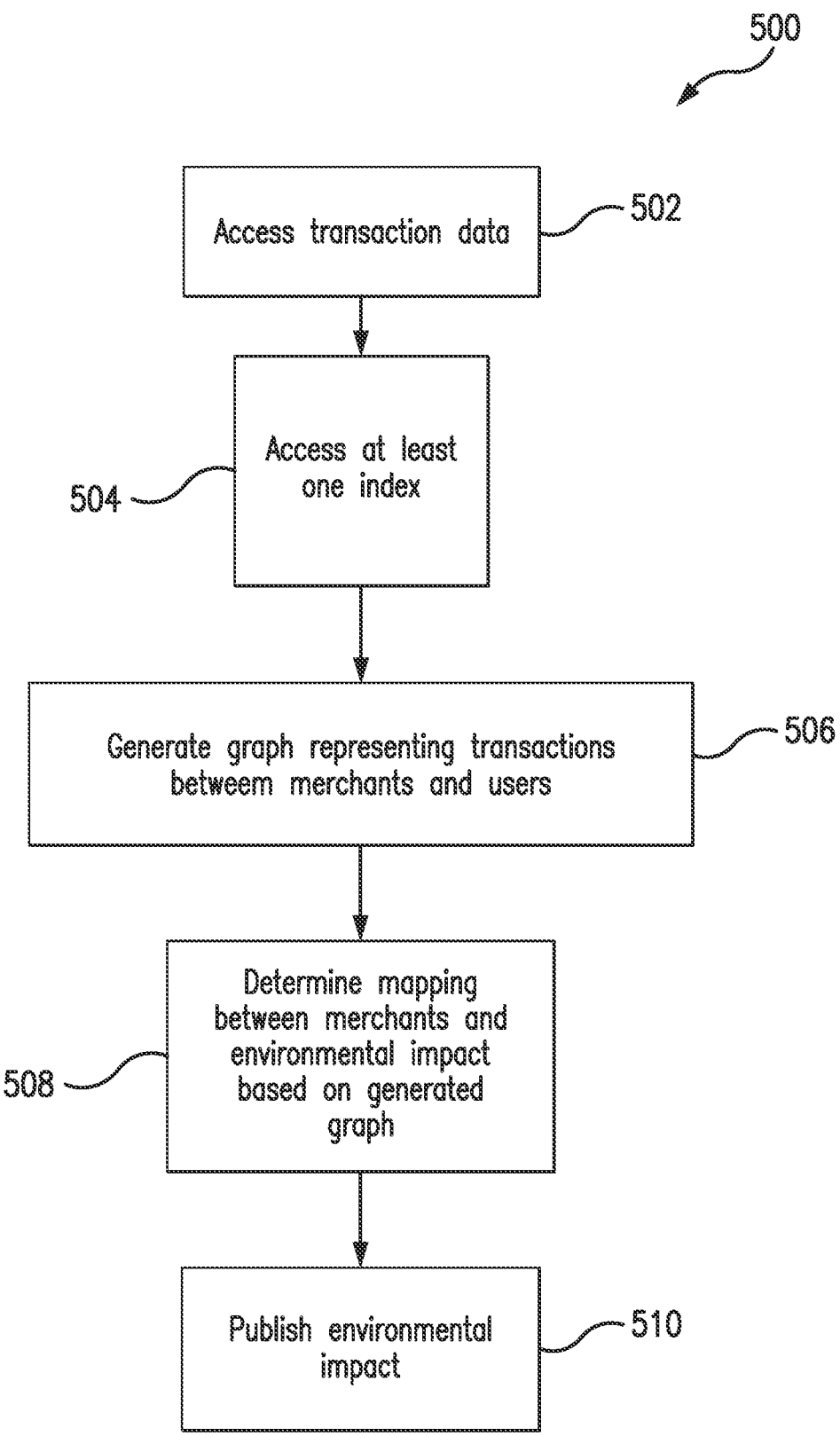
FIG. 5 is an example method that may be implemented in the system of FIG. 1 for determining an environmental impact of one or more transactions by a user.

FIG. 5 illustrates an example method 500 for use in determining an environmental impact of a transaction, or group of transactions, represented by transaction data. The example method 500 is described herein in connection with the computing device 102 of the system 100, and is also described with reference to computing device 400. However, it should be appreciated that the methods herein are not limited to the system 100, or computing device 400. And, likewise, the systems and computing devices described herein are not limited to the example method 500.

At the outset in the method 500, the computing device 102 accesses, at 502, transaction data 106 for a plurality of merchants and users in memory (e.g., the memory 204 associated with the data structure 104, etc.). The transaction data 106 may include, for example, 20 million transaction records, or more or less, involving, for example, thousands of merchants and hundreds of thousands of users. The transaction records, as illustrated in Table 1, for example, may include a merchant identifier, a transaction amount, a category designation (whether it be a super-industry, industry, MCC, etc.), and other suitable data related hereto. At 504, then, the computing device accesses at least one of the indices 108 and 110 (or at least one other similar index), in memory (e.g., the memory 204 associated with the data structure 104, etc.).

At 506, the computing device 102 generates a graph representing the transactions between the merchants and the users. The graph may include, for example, a bipartite graph, or other suitable graph, representative of the relationship between the users and the merchants, by transaction, etc. Then, based on the graph, the computing device 102 determines, at 508, a mapping between the merchants and an environmental impact associated with transactions at the merchants. This may be accomplished by either of the two implementations described above. One implementation may employ a bipartite graph and a GNN analysis to map the merchants to a particular environmental impact. The other implementation may employ a combination of GNN and GCN analysis, and regression, to map the merchant/transaction to an environmental impact.

Thereafter, the computing device 102 publishes, at 510, the environmental impact for the merchants and/or transactions, as a mapping expression or an expression of an environmental impact for a particular merchant or a particular transaction. The impact, or matrix (or mapping), may be published by printing, storing, transmitting (e.g., via email, as a report, as a record, etc.), displaying, etc.

In one example application of the present disclosure, it may be determined that users with similar total spend for a given period (e.g., per month, etc.) may have wide differences in carbon footprints (e.g., depending on where the users spend, on what the users spend, etc.). Further, it may be determined that users with similar spend characteristics (e.g., that have similar total spend for a given period and also spend on similar categories of merchants, etc.) may also have wide differences in carbon footprints. With that said, the present disclosure may be utilized to provide suggestions to users to reduce their carbon footprints (e.g., recommendations for merchants with lower carbon footprints may be recommended, etc.).

In view of the above, the systems and methods herein provide for improved accuracy in representations of dollars to carbon footprint conversions at a transaction level by incorporating detailed personalized insights about merchants and users. As an example, not every customer's spend at a restaurant would incur the same carbon footprint, which may also be different at different times (e.g., summer versus winter, etc.). The systems and methods herein provide for improved accuracy and for a variable carbon-footprint-calculator using artificial intelligence. In one aspect, the systems and methods herein may employ artificial intelligence to calculate carbon footprints of transactions, users and merchants interacting in financial transactional settings at the transaction granularity level. The systems and methods may further rely on graphical representations, and in particular, in some embodiments, bipartite knowledge graphs to represent spend behaviors connecting users and merchants (by way of nodes) through transactions (edges) taking place between them. Space-time complexity may further be introduced in the graph formation in order to capture spend behavior variations across geographies and across time. Thereafter, based on the MCCs of the merchants, the graph based model may be able to place constraints on the merchant node vectors such that only eligible categories are non-zero. For example, an eating place category merchant will have all values zero for the elements corresponding to categories other than a restaurant category, a bakery category and a liquor category, for example. Furthermore, it may be appreciated that the initialization is provided in a probabilistic manner (e.g., a merchant node vector for a pub will have high weightage for bar and liquor categories and low weights for bakery and restaurant categories, etc.). And, in several aspects, transaction data adapted GNN algorithm(s) may be applied to learn the embeddings for user and merchant nodes and transaction edges in a latent space, while GCN algorithm(s) may be additionally or separately applied. Such graph learning approach enables differentiation of the nodes and edges as per the spend behavior. Space-time complexity of the graph embeddings can be dealt with by decomposing the spatio-temporal knowledge graph across seasons and geographies and fine tuning the global learning with localized space-time learning on the components.

Moreover, the systems and methods herein may rely on spatio-temporal GNN analysis, which is supervised, then, to map the learned node and edge embeddings to carbon footprint using known MCC level carbon footprint indices which can come from a variety of sources. This mapping function is then capable of differentiating between users, merchants, and/or transactions due to differences in spend behavior learned from transactional graphs. The geographic and seasonal variations are also captured. Learning carbon footprints at user, merchant and transaction level granularity, along with seasonal and geographic variation, provide improvements over existing solutions. Consequently, the mapping herein may provide actionable intelligence to users (e.g., merchant suggestions to lower carbon footprints, expenditure profile design, etc.) and to merchants (e.g., reward programs for low carbon footprint transactions, etc.) to develop awareness of environmental impact.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the operations or steps recited herein, including, for example: (a) accessing transaction data representative of a plurality of transactions, each of the transactions involving a user and a merchant; (b) accessing at least one index indicative of environmental impact of a plurality of merchants; (c) generating a graph based on the users and merchants included in the transaction data, whereby the graph is representative of the plurality of transactions; (d) determining a mapping between ones of the merchants involved in the transaction data and the environmental impact indicated by the at least one index, based on at least one of: the graph, the accessed at least one index, a graph convolution network (GCN), and a graph neural network (GNN); and (e) publishing the mapping between the ones of the merchants and the environmental impact..

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail (but this does not mean any aspect of the recited claims is well-known). In addition, advantages and improvements that may be achieved with one or more example embodiments of the present disclosure are provided for purpose of illustration only and do not limit the scope of the present disclosure, as example embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining an environmental impact associated with one or more transactions, the method comprising:

accessing transaction data representative of a plurality of transactions, each of the transactions involving a user and one of multiple merchants, each of the merchants being associated with a merchant category code;

accessing an environmental impact index indicative of environmental impact of a plurality of merchants, the environmental impact index including an environmental impact value for each of a plurality of categories, the plurality of categories of the environmental impact index being independent of the merchant category codes;

generating a graph based on the users and merchants included in the transaction data, the graph including a node for each one of the users, a node for each one of the merchants, and edges between the nodes whereby the graph is representative of the plurality of transactions;

determining a mapping between ones of the merchants involved in the transaction data and the environmental impact indicated by the environmental impact index, based on the graph and the accessed environmental impact index by:

iteratively applying a graph convolution network (GCN) to generate a vector representing environmental impact of the ones of the merchants;

learning, via a graph neural network (GNN), embeddings for the graph, for each node representative of the ones of the merchant, which include, for each node: features of the node, features of neighboring edges of the node, and states of neighboring one(s) of the nodes for said node, the features of the node including merchant variables of the merchant represented by said node;

stacking the embeddings, along with output vectors for each node, into a matrix representing environmental impact of the ones of the merchants represented by the nodes; and combining, via regression and weighted learning, the vector from the GCN and the matrix from the GNN to thereby provide the mapping; and publishing the mapping between the ones of the merchants and the environmental impact indicated by the environmental impact index, to thereby enable the user to reduce environmental impact associated with subsequent transactions.

2. The computer-implemented method of claim 1, wherein the graph includes a bipartite graph.

3. The computer-implemented method of claim 1, wherein determining the mapping includes performing at least one regression based on the environmental impact index.

4. The computer-implemented method of claim 1, wherein the mapping includes a carbon footprint per monetary increment for the ones of the merchants.

5. A system for determining an environmental impact associated with one or more transactions, the system comprising a computing device configured to:

access transaction data representative of a plurality of transactions, each of the transactions involving a user and one of multiple merchants, each of the merchants being associated with a merchant category code;

access an environmental impact index indicative of environmental impact of a plurality of merchants, the environmental impact index including an environmental impact value for each of a plurality of categories, the plurality of categories of the environmental impact index being independent of the merchant category codes;

generate a graph based on the users and merchants included in the transaction data, the graph including a node for each one of the users, a node for each one of the merchants, and edges between the nodes whereby the graph is representative of the plurality of transactions;

determine a mapping between ones of the merchants involved in the transaction data and the environmental impact indicated by the environmental impact index, based on: (a) the graph, (b) the accessed environmental impact index, (c) iterative application of a graph convolution network (GCN) to generate a vector representing environmental impact of the ones of the merchants, (d) learned embeddings for the graph, via a graph neural network (GNN), for each node representative of the ones of the merchant, which include, for each node: features of the node, features of neighboring edges of the node, and states of neighboring one(s) of the nodes for said node, the features of the node including merchant variables of the merchant represented by said node stacked into a matrix representing environmental impact of the ones of the merchants, and (e) combination of the vector from the GCN and the matrix from the GNN via regression to thereby provide the mapping; and publish the mapping between the ones of the merchants and the environmental impact indicated by the environmental impact index, to thereby enable the user to reduce environmental impact associated with subsequent transactions.

6. The system of claim 5, wherein the graph includes a bipartite graph, including nodes representative of the users, nodes representative of the merchants, and edges between ones of said nodes representative of the transactions.

7. The system of claim 5, wherein the computing device is configured, in order to determine the mapping, to perform at least one regression based on the environmental impact index.

8. The system of claim 5, wherein the mapping includes a carbon footprint per monetary increment for the ones of the merchants.

9. A non-transitory computer-readable storage medium comprising executable instructions for use in executing logic to determine environmental impact associated with one or more transactions, which when executed by at least one processor, cause the at least one processor to:

access transaction data representative of a plurality of transactions, each of the transactions involving a user and one of multiple merchants, each of the merchants being associated with a merchant category code;

access an environmental impact index indicative of environmental impact of a plurality of merchants, the environmental impact index including an environmental impact value for each of a plurality of categories, the plurality of categories of the environmental impact index being independent of the merchant category codes;

generate a graph based on the users and merchants included in the transaction data, the graph including a node for each one of the users, a node for each one of the merchants, and edges between the nodes whereby the graph is representative of the plurality of transactions;

determine a mapping between ones of the merchants involved in the transaction data and the environmental impact indicated by the environmental impact index, based on the graph and the accessed environmental impact index by:

iteratively applying a graph convolution network (GCN) to generate a vector representing environmental impact of the ones of the merchants;

learning, via a graph neural network (GNN), embeddings for the graph, for each node representative of the ones of the merchant, which include, for each node: features of the node, features of neighboring edges of the node, and states of neighboring one(s) of the nodes for said node, the features of the node including merchant variables of the merchant represented by said node;

stacking the embeddings, along with output vectors for each node, into a matrix representing environmental impact of the ones of the merchants represented by the nodes; and combining, via regression and weighted learning, the vector from the GCN and the matrix from the GNN to thereby provide the mapping; and publish the mapping between the ones of the merchants and the environmental impact indicated by the environmental impact index, to thereby enable the user to reduce environmental impact associated with subsequent transactions.

10. The non-transitory computer-readable storage medium of claim 9, wherein the graph includes a bipartite graph, including nodes representative of the users, nodes representative of the merchants, and edges between ones of said nodes representative of the transactions.

11. The non-transitory computer-readable storage medium of claim 10, wherein the executable instructions, when executed by the at least one processor to determine the mapping, cause that at least one processor to perform at least one regression based on the environmental impact index.

12. The non-transitory computer-readable storage medium of claim 10, wherein the mapping includes a carbon footprint per monetary increment for the ones of the merchants.

* * * * *